(12) United States Patent
Kämmler

(10) Patent No.: US 7,192,253 B2
(45) Date of Patent: Mar. 20, 2007

(54) METHOD FOR PRODUCING A FAN WHEEL AND FAN WHEEL PRODUCED BY THIS METHOD

(75) Inventor: Georg Kämmler, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 215 days.

(21) Appl. No.: 10/975,038

(22) Filed: Oct. 28, 2004

(65) Prior Publication Data

US 2005/0123712 A1    Jun. 9, 2005

(30) Foreign Application Priority Data

Oct. 28, 2003 (DE) ................ 103 50 417

(51) Int. Cl.
*F04D 29/02* (2006.01)
(52) U.S. Cl. ............. 416/169 A; 416/234; 29/889.3
(58) Field of Classification Search ......... 416/234, 416/169 A; 29/889.3
See application file for complete search history.

(56) References Cited

U.S. PATENT DOCUMENTS

| | | | |
|---|---|---|---|
| 4,358,245 A * | 11/1982 | Gray | ............... 416/189 |
| 4,826,645 A | 5/1989 | Angus | |
| 4,880,587 A | 11/1989 | Fichlseder et al. | |
| 5,076,760 A * | 12/1991 | Weetman et al. | ....... 416/204 R |
| 5,538,395 A | 7/1996 | Hager | |
| 6,100,611 A | 8/2000 | Nakase | |
| 6,488,413 B1 | 12/2002 | Wan | |
| 6,558,603 B2 | 5/2003 | Wobbe et al. | |
| 6,660,196 B1 | 12/2003 | Iwase et al. | |

FOREIGN PATENT DOCUMENTS

| | | |
|---|---|---|
| DE | 69 38 710 | 10/1970 |
| DE | 30 15 334 A1 | 10/1981 |
| DE | 35 23 517 C2 | 2/1986 |
| DE | 233 732 A3 | 3/1986 |
| DE | 42 04 531 A1 | 8/1993 |
| JP | 55-40271 A | 3/1980 |
| JP | 4-339198 A | 11/1992 |
| JP | 2003-94494 A | 4/2003 |
| WO | WO 00/37233 A1 | 6/2000 |

OTHER PUBLICATIONS

J. Breitenbach, "Das Material der Wahl für Bürostuhl-Fußkreuze", Plastverarbeiter, Nov. 1, 1990, pp. 126, 128, 130, 132, 134, 136, vol. 41, No. 11.
W. Lucius, "Praktische Erfahrungen beim Spritzgießen glasfaserverstärkter Thermoplaste" Kunststoffe, Jun. 1973, pp. 367-372, vol. 63, No. 6.

(Continued)

*Primary Examiner*—Richard A. Edgar
(74) *Attorney, Agent, or Firm*—Foley & Lardner LLP

(57) ABSTRACT

A method for producing a fan wheel (1), in particular for a motor vehicle, which is produced by injection molding of a plastic provided with glass fibers, the casting compound being cast in via a ring or cone gate. Also disclosed is a fan wheel (1) produced by this method.

17 Claims, 2 Drawing Sheets

OTHER PUBLICATIONS

U. Moritz, "Flexibler spritzgießen mit dem, Varioprinzip", Kunststoffberater, Sep. 1, 1991, pp. 50-51, vol. 36, No. 9.

Erwin Burkle, et al., "Spritzgieß-verarbeitung von langglasfaser—verstärktem PP", Kunststoffe, Mar. 2003, pp. 47-50, vol. 93, No. 3.

Martin Bastian, et al., "Ernst zu nehmende Alternative Beachtliche Bauteileigenschaften durch Variation der Prozessbedingugen beim S-LFT-Verfahren", Kunststoffe, Feb. 2002, pp. 22-27, vol. 92, No. 2.

"Steel Strengthens Nylon Truck Fan", Machine Design, Jan. 10, 1991, vol. 63, No. 1.

H. M. Ceasar, "Mineralverstärkte Polyamide, eine neue Klasse technischer Kunststoffe?" (Mineral Reinforced Polyamides a new Class of Technical Plastic?), Plastverarbeiter 32, No. 10, Jan. 1981, pp. 1382-1386.

M. Zettler et al., "Stand der Verarbeitungs- und Anwendungstechnik bei langfaserverstärken thermoplasten" (State of Processing technology and Applications for Long Fiber Reinforced thermoplastics), Kunstoffe 79 (1989) 9, pp. 797-803.

* cited by examiner

/ Weld line

↙ Direction of flow

╱ Orientation of glass fibers

• Gate

- Weld line
- Direction of flow
- Orientation of glass fibers
- Gate

METHOD FOR PRODUCING A FAN WHEEL AND FAN WHEEL PRODUCED BY THIS METHOD

CROSS-REFERENCE TO RELATED PATENT APPLICATIONS

Federal Republic of Germany Priority Application 103 50 417.6, filed Oct. 28, 2003 including the specification, drawings, claims and abstract, is incorporated herein by reference in its entirety.

BACKGROUND OF THE INVENTION

The invention relates to a method for producing a fan wheel, in particular for a motor vehicle.

Due to the mechanical and thermal loads, axial-flow fans or ring fans for trucks are conventionally produced from PA6 (Nylon-6) with glass fibers as filler. One disadvantage of PA6 (Nylon-6) is that it absorbs water which brings with it a severe change in the mechanical characteristic values, i.e. the fan wheels always have to be designed with regard to the maximum water-absorption range. As a result, oversizing may occur. Furthermore, PA6 (Nylon-6) has a relatively high density, so the fan wheels are relatively heavy. This results, inter alia, in disadvantages (i) in the balancing quality and, (ii) in the driving mode, for the acceleration of the particular fan wheel. Fan wheels of this type are usually injection molded, for which purpose the casting compound is injected via a plurality of gate points.

FIG. 2 illustrates a conventional fan wheel 1 (jet ring fan). In order to produce the fan wheel, plastic is injected into the mold via a plurality of gate points. The plastic compound first fills the inner ring 3, then the fan wheel blades 2 and, finally, the outer ring. For optimized filling of the fan wheel blades 2, each fan wheel blade 2 is assigned a gate point. As a result, weld lines between the individual fan wheel blades 2 are produced on the inner ring 3 and on the outer ring.

A fan wheel produced by this known method leaves something to be desired, in particular with regard to the strength.

SUMMARY OF THE INVENTION

It is an object of the invention to provide an improved method for producing a fan wheel.

In accomplishing an object of the invention, there has been provided, according to one aspect of the invention, a method for producing a fan wheel, comprising (a) injection molding a casting compound into a mold;(b) providing a ring or fan gate; and (c) directing the casting compound through the ring or fan gate toward an outer ring of the fan wheel.

According to another aspect of the invention, there has been provided a fan wheel produced according to the foregoing method.

According to yet another aspect of the invention, there has been provided a motor vehicle comprising a fan wheel produced by the foregoing method.

In accordance with a further aspect of the invention, there has been provided a fan wheel comprising a metal inner ring which is at least partially surrounded in a radial direction by a casting compound in a manner free from weld lines.

BRIEF DESCRIPTION OF THE DRAWINGS

The invention is described in detail below with reference to the exemplary embodiments and with reference to the accompanying drawings, in which.

Further objects, features and advantages of the invention will become apparent from the detailed description of preferred embodiments which follows, when considered together with the accompanying drawings.

DETAILED DESCRIPTION OF THE PREFERRED EMBODIMENTS

According to one aspect of the invention, a method for producing a fan wheel, in particular an axial-flow fan or jet ring fan for a motor vehicle, is provided. The fan wheel may be produced by means of injection molding of a plastic provided with glass fibers, and, in the process, the casting compound may be cast in via a ring or fan gate. Due to the ring or fan gate, the casting compound flows in uniformly over the entire circumference of the fan wheel without the formation of weld lines on the inner ring, as a result of which the strength is increased.

Polypropylene is preferably used as the casting compound, but PA6 (Nylon-6) or another plastic may also be used. If PA6 (Nylon-6) is used, the permissible nominal speed can be increased in order to achieve a greater mass air flow and therefore a greater cooling capacity, so that the oversizing which is required due to the absorption of water can be compensated for to some extent.

As an alternative, mixtures of different plastics may also be used, such as, for example, PPO/PA (polyphenylene oxide/polyamide) or PPE/PP (polyphenylene ether/polypropylene).

The casting compound preferably includes fillers, in particular glass fibers, preferably having lengths of over 1 mm. During the injection molding, the fibers are aligned with a significant tangential orientation in the inner ring region.

In the case of direct compounding, a very sparing inclusion of fiber lengths of, for example, over 1 mm is easily possible. This enables further increases in strength, in particular if polypropylene is used with glass fibers as filler. In principle, granules of long fibers may also be processed in the injection molding process, but direct compounding is preferred.

Figure 1:
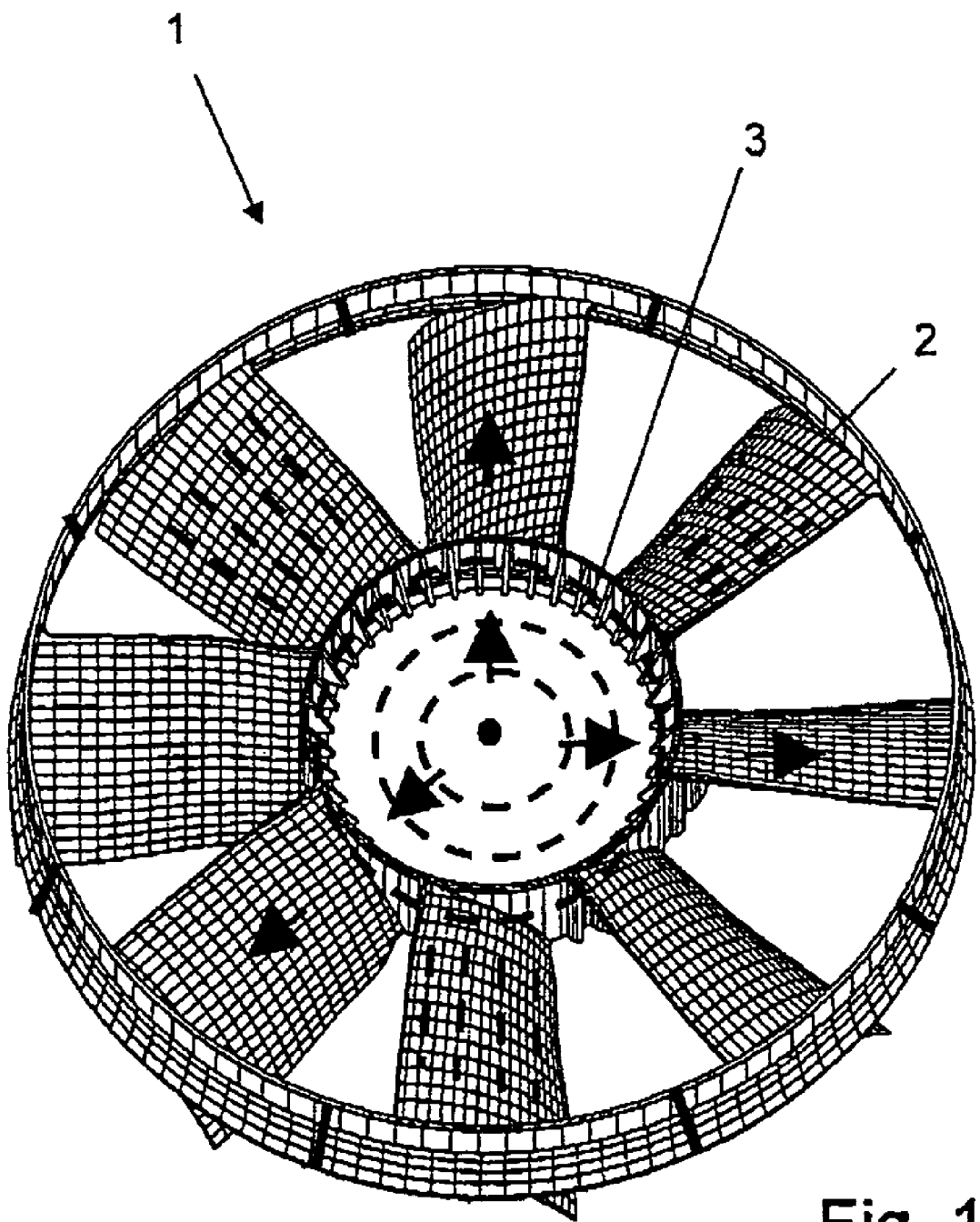
FIG. 1 shows a fan wheel according to an exemplary embodiment of the present invention.
Figure 2:
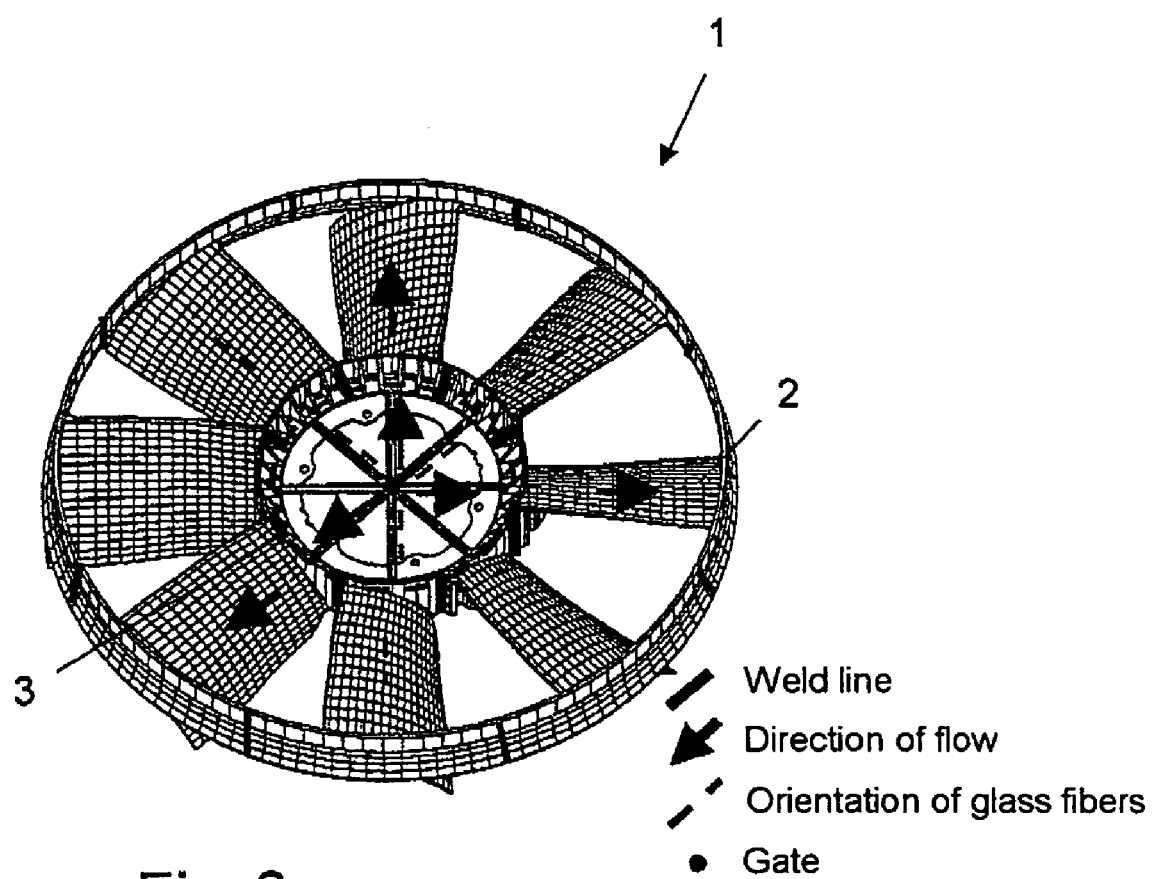
FIG. 2 shows a conventional fan wheel.

Turning now to the drawings, FIG. 1 shows a fan wheel 1, in the present case a jet ring fan (JRF), which has a metallic flange ring (not shown in FIG. 1 for clarity; c.f FIG. 2, however) which is encapsulated by injection molding and absorbs the moments or torque. An adjoining, closed plastic ring, also referred to below as the inner ring 3 to which fan blades 2 are connected, serves to stabilize the fan wheel 1, in particular against splitting. The production takes place by means of injection molding, with a ring or fan gate being provided. Ring gates and fan gates are, in and of themselves, well known in the injection molding art, e.g., U.S. Pat. No. 4,880,587, No. 6,488,413 and No. 6,660,196, the disclosures of which are hereby incorporated by reference. As a result, the casting compound flows in uniformly and simultaneously over the entire circumference without the formation of weld lines (see FIG. 1), which occur in fan wheels produced in a conventional manner. After injection molding has taken place, the ring or fan gate is removed.

The ring or fan gate provided according to a preferred embodiment of the invention firstly has the advantage that weld lines are prevented in the inner plastic ring 3. As a result, the inner plastic ring 3 is considerably strengthened. The ring or fan gate provided according to a preferred embodiment of the invention also has the advantage that, due to the fan gate, a significant tangential orientation, both of the melt and of the fillers contained in the melt, occurs, resulting in an additional reinforcing effect. Since the melt changes its direction of flow on entry into the fan blades 2, the melt and the fillers are simultaneously reorientated in the drawing direction of the adjoining fan blades and there is therefore a further increase in strength of the entire fan wheel 1 to match the stress.

An exemplary material used is polypropylene having long glass fibers (in particular having a length of more than 1 mm) as filler, thereby enabling the material costs to be reduced. Due to the lower density of polypropylene in comparison to the conventionally used PA6 (Nylon-6), the overall weight of the fan wheel 1 is also reduced.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A method for producing a fan wheel having an inner hub, a plurality of fan blades extending radially from the hub and an outer ring connected with distal ends of the fan blades, the method consisting essentially of:
   (a) injection molding a casting compound into a mold cavity that includes a generally disk-shaped cavity having a shape corresponding to a generally solid, disk-shaped central hub of the fan wheel, wherein said cavity is generally hollow prior to said molding;
   (b) providing a ring or fan gate adjacent to the center of the disk-shaped cavity;
   (c) directing the casting compound through the ring or fan gate in all directions toward the outer ring of the fan wheel to fill the mold cavity; and
   (d) removing the ring or fan gate,
   wherein the casting compound comprises a reinforcing fiber filler, and
   wherein the reinforcing fiber is aligned in a tangential orientation in the generally solid, disk-shaped central hub of the fan wheel.

2. A method according to claim 1, wherein the casting compound comprises polypropylene.

3. A method according to claim 1, wherein the casting compound comprises nylon 6.

4. A method according to claim 1, wherein the casting compound comprises a mixture of plastics.

5. A method according to claim 4, wherein the casting compound comprises polyphenylene oxide/polyamide mixture or a polyphenylene ether/polypropylene mixture.

6. A method according to claim 1, wherein the reinforcing fiber filler comprises glass fibers having a length greater than 1 mm.

7. A method according to claim 1, further comprising direct compounding of the casting compound.

8. A method according to claim 1, wherein the step of injection molding further comprises encapsulating a metal ring at an edge of the central hub.

9. A fan wheel produced according to the method of claim 1.

10. A fan wheel according to claim 9, wherein the fan wheel comprises polypropylene, nylon 6, polypropylene, a polyphenylene oxide/polyamide mixture or a polyphenylene ether/polypropylene mixture.

11. A fan wheel according to claim 9, wherein the fan wheel comprises a fan central hub region which is free of weld lines and comprises a casting compound having reinforcing fiber filler with a tangential orientation.

12. A fan wheel according to claim 9, wherein the fan wheel comprises a fan blade region which comprises a casting compound having a longitudinal orientation.

13. A fan wheel according to claim 9, wherein the fan wheel comprises a metal ring which is at least partially surrounded in a radial direction by the casting compound in a manner free from weld lines.

14. A motor vehicle comprising a fan wheel according to claim 9.

15. A fan wheel comprising:
   a metal ring which is at least partially surrounded in a radial direction by a casting compound in a manner free from weld lines;
   wherein the casting compound comprises a reinforcing fiber filler;
   wherein the reinforcing fiber filler is aligned in a tangential orientation in an inner substantially disk-shaped hub of the fan wheel.

16. A fan wheel according to claim 15, wherein the fan wheel comprises a fan blade region which comprises a casting compound in which the reinforcing fibers have a longitudinal orientation.

17. A motor vehicle comprising a fan wheel according to claim 15.

* * * * *